US009602967B2

(12) United States Patent
Hines et al.

(10) Patent No.: US 9,602,967 B2
(45) Date of Patent: *Mar. 21, 2017

(54) LOCATION DERIVED PRESENCE INFORMATION

(71) Applicant: TELECOMMUNICATION SYSTEMS, INC., Annapolis, MD (US)

(72) Inventors: Gordon Hines, Kirkland, WA (US); Mario G. Tapia, Seattle, WA (US); Will Cousins, Seattle, WA (US); Patrick Carey, Seattle, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/200,819

(22) Filed: Jul. 1, 2016

(65) Prior Publication Data

US 2016/0316327 A1    Oct. 27, 2016

Related U.S. Application Data

(63) Continuation of application No. 14/613,607, filed on Feb. 4, 2015, now Pat. No. 9,398,419, which is a continuation of application No. 14/021,319, filed on Sep. 9, 2013, now Pat. No. 8,983,048, which is a continuation of application No. 13/200,821, filed on Oct. 3, 2011, now Pat. No. 8,532,277, which is a continuation of application No. 12/007,947, filed on Jan. 17, 2008, now Pat. No. 8,032,112, which is a continuation of application No. 10/395,217, filed on Mar. 25, 2003, now Pat. No. 7,426,380.

(60) Provisional application No. 60/367,708, filed on Mar. 28, 2002.

(51) Int. Cl.
*H04M 3/42* (2006.01)
*H04W 4/02* (2009.01)
*H04L 29/08* (2006.01)

(52) U.S. Cl.
CPC ............. *H04W 4/02* (2013.01); *H04L 67/04* (2013.01); *H04L 67/18* (2013.01); *H04W 4/025* (2013.01)

(58) Field of Classification Search
CPC .......... H04L 67/04; H04L 67/18; H04W 4/02; H04W 4/025
USPC ............ 342/357.01, 357.06, 357.09, 357.13, 342/357.25, 357.46, 357.47; 379/201.06–201.1; 455/404.2, 410, 411, 455/414.2, 435.1, 456.1, 456.2, 456.3, 455/457, 461, 11.1
See application file for complete search history.

(56) References Cited

U.S. PATENT DOCUMENTS

| | | | | |
|---|---|---|---|---|
| 8,032,112 B2 * | 10/2011 | Hines | ...................... | H04W 4/02 342/357.25 |
| 8,532,277 B2 * | 9/2013 | Hines | ...................... | H04W 4/02 342/357.25 |
| 8,983,048 B2 * | 3/2015 | Hines | ...................... | H04W 4/02 342/357.25 |

* cited by examiner

*Primary Examiner* — Harry S Hong
(74) *Attorney, Agent, or Firm* — Tarolli, Sundheim, Covell & Tummino LLP

(57) ABSTRACT

The number of messages required in networks where both location and presence services are deployed may be reduced, by retrieving presence data from messages otherwise intended to provide only location information. Thus, information determined in a location service scheme is utilized to provide a presence service as well. A location server requests mobile subscriber (MS) information from a Core Network (CN) Node (i.e. HLR, MSC, etc.) that can be used in determining the Location of the MS. A single message (Continued)

aggregates retrieval of information for two services, specifically, for both location and presence.

20 Claims, 2 Drawing Sheets

Diagram showing a LCS request generating a Presence response.

LOCATION DERIVED PRESENCE INFORMATION

This application is a continuation of U.S. patent application Ser. No. 14/613,607, entitled "Location Derived Presence Information", to Hines et al., filed on Feb. 4, 2015, which in turn in a continuation of U.S. patent application Ser. No. 14/021,319, entitled "Location Derived Presence Information", to Hines et al., filed on Sep. 9, 2013, now U.S. Pat. No. 8,983,048; which in turn is a continuation of U.S. patent application Ser. No. 13/200,821, entitled "Location Derived Presence Information," to Hines et al., filed on Oct. 3, 2011, now U.S. Pat. No. 8,532,277; which in turn is continuation of U.S. patent application Ser. No. 12/007,947, entitled "Location Derived Presence Information," to Hines et al., filed on Jan. 17, 2008, now U.S. Pat. No. 8,032,112; which in turn is a continuation of U.S. patent application Ser. No. 10/395,217, entitled "Location Derived Presence Information," to Hines et al., filed on Mar. 25, 2003, now U.S. Pat. No. 7,426,380; which claims priority from U.S. Provisional Appl. No. 60/367,708, entitled "Location Derived Presence Information", filed Mar. 28, 2002, by Hines et al., the entirety of all of which are explicitly incorporated herein by reference.

BACKGROUND OF THE INVENTION

1. Field of the Invention

This invention relates generally to wireless communication carriers. More particularly, it relates to location and presence-based services for the wireless industry.

2. Background of Related Art

The term "presence" in the wireless world typically relates to a network answer to the simple question "Are you available?". For instance, if a subscriber's wireless device is turned off, they would not be available. However, if a subscriber's wireless device is turned on, and in communication with a carrier, the carrier would most likely be able to indicate to a relevant request that the subscriber is available and thus "present". The functions and use of presence information is well known in the art.

Location information regarding subscribers is increasingly becoming available in a wireless network. This is particularly true in systems that comply with E-9-1-1 requirements. Location information relates to absolute coordinates of a wireless device.

Both Location and Presence services are message intensive on telecom networks. Message reduction in general is desirable, both to allow increased capacity in a wireless network, as well as to improve reliability of the system by reducing the number of messages.

SUMMARY OF THE INVENTION

In accordance with the principles of the present invention, a method and apparatus provides presence information regarding a wireless device. A request for location information regarding a wireless device is received. Presence information regarding the wireless device is provided in response to the receipt of the request for location information regarding the wireless device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
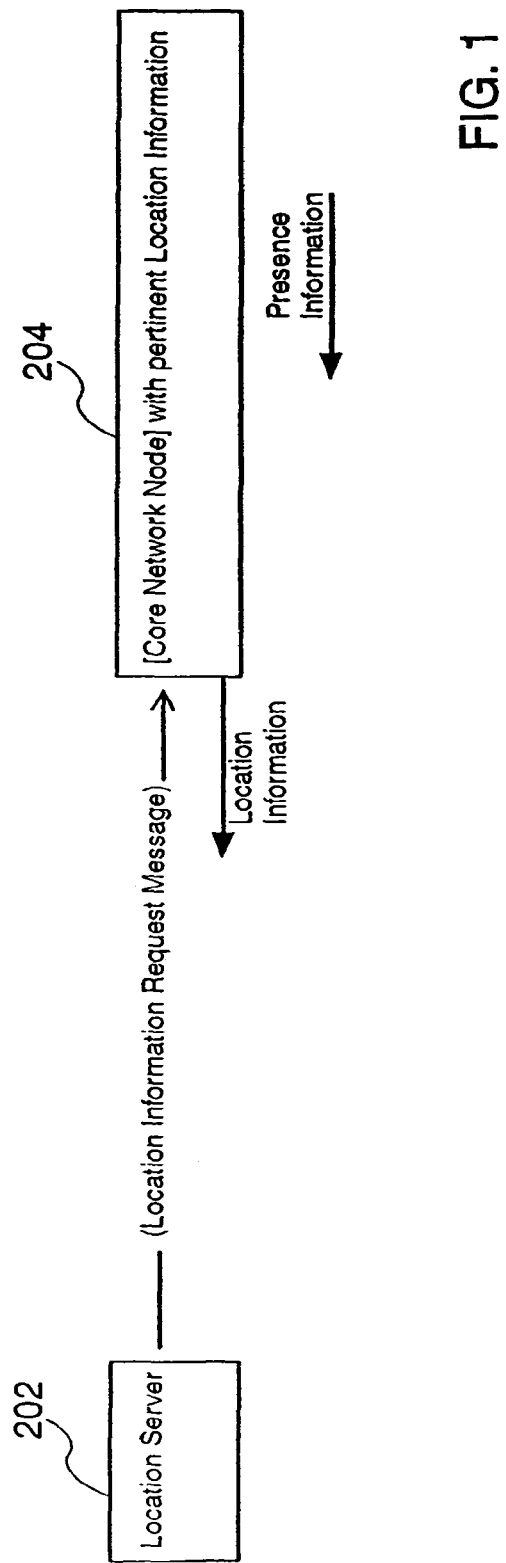
FIG. 1 shows generally a location request.

The present invention recognizes the duplicity of information provided by location and presence services, and reduces the number of messages required in networks where both Location and Presence services are deployed.

To reduce the amount of messaging within the core network, the present invention retrieves presence data from messages intended to provide location information. Thus, information determined in a Location service scheme is utilized to provide a presence service as well.

In accordance with the present invention, a Location Server requests mobile subscriber (MS) information from a Core Network (CN) Node (i.e. HLR, MSC, etc.) that can be used in determining the Location of the MS. In most cases the messages used for requesting Location and Presence services are the same. The proposed concept uses a single message to aggregate information for two services, specifically Location and Presence.

Entirely new revenue streams may be realized by carriers through a location services solution, e.g., the Xypoint Location Platform (XLP) available from TeleCommunication Systems, Inc. in Annapolis, Maryland. The XLP preferably integrates three centers that wireless carriers should have to effectively gather, manage, protect and distribute wireless data, and ultimately, collect revenue from subscribers for doing so. With the ability to offer the full array of location-based services-everything from enhanced 411 services, to location-based games, child tracking and location-specific advertising-carriers can add a whole new profit center to their business models, including generating non-subscriber revenue. The three module centers in the exemplary XLP used in the disclosed embodiments are a Location Center, a Presence Center, and a Privacy Center.

Location Center—Determines the location of mobile users from the wireless network and provides a single point of access for location-based applications. The XLP Location Center preferably includes a mobile positioning center (MPC), e.g., a fully J-STD-036-compliant Mobile Positioning Center (MPC) to deliver E911 Phase I services.

Presence Center—Enhances an application's ability to communicate with the mobile user by determining the state and availability of the mobile user to receive a text message, WAP push or incoming call. Presence enables applications such as instant messaging and allows for options such as determining who on your "buddy list," is available.

Privacy Center—Ensures that carriers and mobile subscribers are firmly in control of their data. It allows users to choose exactly which location and presence information to make available to specific vendors or other users.

The XLP is preferably implemented as either a fully turnkey (in-house), hosted or hybrid solution, allowing carriers to pick and choose the best solution to meet their business needs. Whether a carrier opts for in-house or hosted services, the XLP provides a highly available and scalable distributed network architecture. The XLP also offers carriers the flexibility to choose the position determining entity (PDE) that will best meet their current needs while also minimizing over-lapping integration of applications and services.

The MPC technology integrated within the XLP's Location Center has been deployed to support E911 Phase I services. The Xypoint Location Platform available from Telecommunication Systems, Inc. has been integrated with well over 100 commercially available switches including Lucent, Nortel, Motorola and Ericsson. The XLP is preferably network independent and supports all major wireless interfaces, including GSM, CDMA, TOMA and AMPS.

FIG. 1 shows generally a location request to a core network node containing pertinent location information, resulting not only in a return of location information, but also in the spawning of presence information.

In particular, as shown in FIG. 1, a location server 202 requests location information regarding a particular mobile subscriber (MS) from a core network node 204, e.g., from a Mobile Switch Center (MSC). Requested information regarding a particular wireless device (MS) may include, e.g., attach, detach, and location area update. The location server 202 may also request information regarding the wireless device such as attach, detach and/or location area update from a Packet Date Node (e.g., SGSN, GGSN, or PDSN).

Typically, location information regarding a particular wireless device is requested of a home location register (HLR). In accordance with the principles of the present invention, the home location register can also serve as a basis for presence services. Exemplary presence services may include, e.g., the state and/or status of a subscriber.

Importantly, in accordance with the present invention, information relating to presence is spawned or triggered by a location request. The presence information may or may not be returned along with the location information, but preferably is included within the message (or messages) containing location information.

Figure 2:
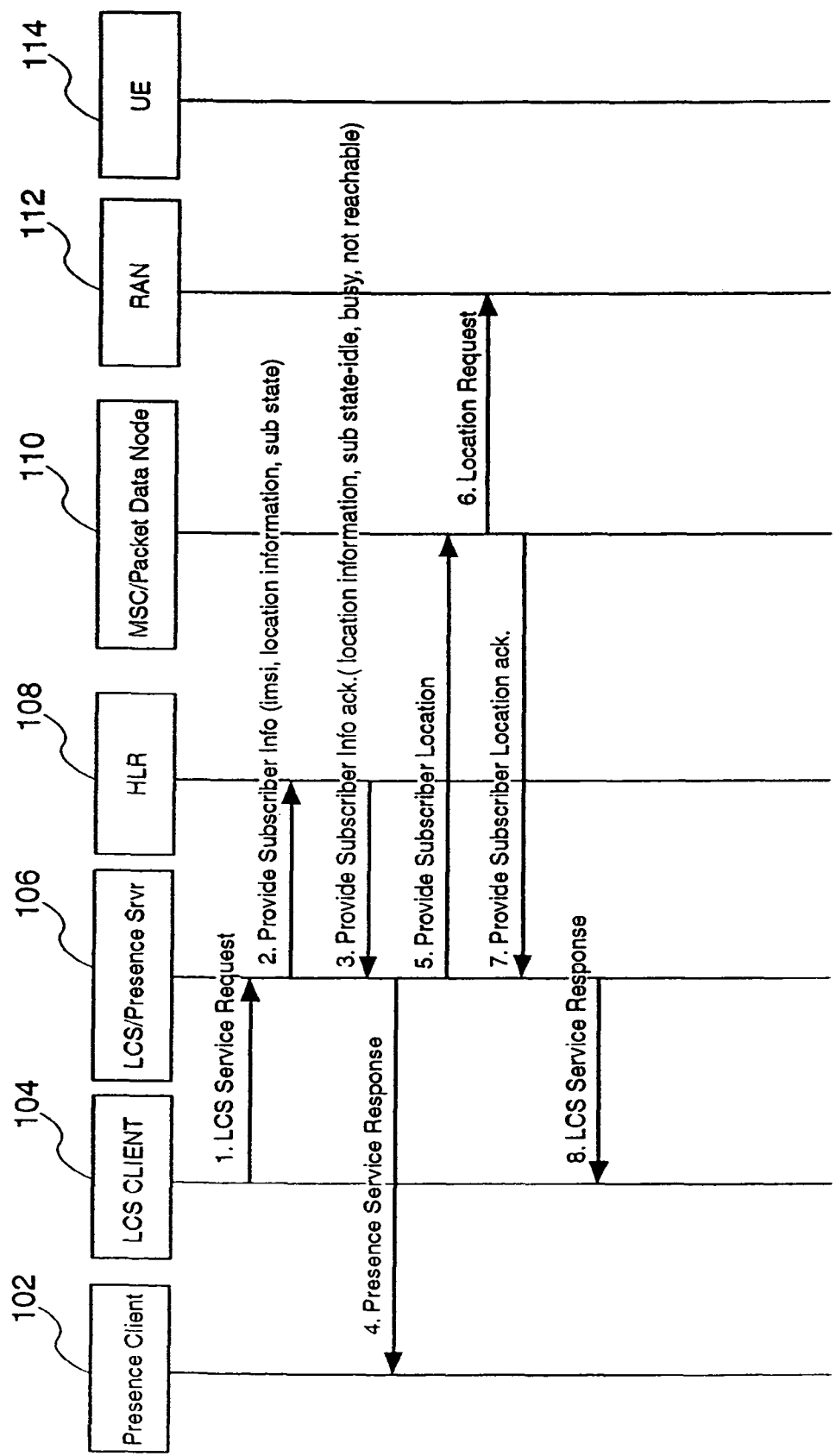
FIG. 2 shows a Location Services (LCS) request generating a presence response, in accordance with the principles of the present invention.

FIG. 2 shows an exemplary Location Services (LCS) request generating a response including presence information in more detail, in accordance with the principles of the present invention.

In particular, FIG. 2 shows exemplary messaging between a presence client 102, a location service client 104, a location/presence server 106, a home location register (HLR) 108, a core network node such as an MSC or packet data node 110, and a radio access network (RAN) 112.

In the exemplary embodiment, the messaging cycle is initiated (shown in Step 1) by a location services client 104, that transmits a location request message to a location services/presence server 106 in the relevant carrier's network.

In step 2, a Provide Subscriber Info message is transmitted by the location services/presence services server 106 to the home location register 108 (or other node containing location and/or presence information). The Provide Subscriber Info message can request location information and/or subscriber state. In this use case, location information regarding a particular subscriber is being requested, and within the same message, presence information such as subscriber state may also be requested. Requested presence information can include, e.g., idle, bust, not reachable, etc.

In step 3, the network node containing the location and presence information (e.g., the Home Location Register (HLR) 108) provides the requested location information and presence information (e.g., idle, bust, not reachable, etc.) back to the location services/presence services server 106.

In step 4, the location services/presence services server 106 uses the returned subscriber info, and transmits a Presence Service Response to a relevant presence application, e.g., a presence client 102 depicted in FIG. 2.

This 'freebie' presence information is an important aspect of the present invention. For instance, an entirely separate presence application 102 may register with a particular carrier, perhaps paying suitable fees, for the right to receive presence information for those wireless devices that have had location information returned. This avoids the need for the presence client 102 to separately request presence information regarding that particular wireless device.

In step 5, the location services/presence services server 106 requests updated location information of the wireless network, i.e., sending a request for current location information from a relevant network node (e.g., the MSC or packet data node 110).

The MSC, packet data node 110, etc. may determine a current location of the relevant wireless device using any suitable location technology, e.g., using a global positioning satellite (GPS) system, using triangulation, using angle of arrival, etc.

As part of the determination of a current location of the wireless device, as shown in step 6, the location request may be forwarded to a Radio Access Network. This would be necessary for certain locating technologies (e.g., for triangulation, angle of arrival, etc.). If a global positioning satellite system is utilized, the location request may be forwarded to a suitable GPS application in the wireless network that receives GPS location information regarding a relevant wireless device.

In step 7, a response to the update location information request is transmitted to the location services/presence services server 106. (The updated location information may also be forwarded to the HLR (not shown in FIG. 2) to update the current location of the relevant wireless device).

Lastly, in step 8, the location information initially requested by the LCS application or client 104 is returned. This returned information ideally includes current location information freshly obtained from the MSC 110 or other network node, but may instead be cached location information stored in the HLR 108 if the location information is not returned within a sufficient time window (e.g., causing a timeout).

The present invention provides benefits such as reducing core network messaging traffic, providing better XLP performance, and allowing the use of cached presence data relating to wireless devices, allowing quick and easy access to presence data.

While the invention has been described with reference to the exemplary embodiments thereof, those skilled in the art will be able to make various modifications to the described embodiments of the invention without departing from the true spirit and scope of the invention.

What is claimed is:

1. A server comprising:
   a memory to store machine-executable instructions; and
   one or more processors to execute the machine-executable instructions causing the server to at least:
      transmit, at the server, a location request to a core network node, the location request including a request for a current location of a particular wireless device;
      receive, at the server, a message from the core network node comprising location information for the particular wireless device and presence information for the particular wireless device in response to the location request;
      transmit, at the server, the location information for the particular wireless device to a given application operating on a given network node; and transmit, at the server, the presence information for the particular wireless device to another application operating on another network node.

2. The server of claim 1, wherein the other application subscribes to the presence information for the particular wireless device.

3. The server of claim 1, wherein the given application triggers the location request and other application receives the presence information for the particular wireless device without requesting the presence information for the particular wireless device.

4. The server of claim 1, wherein the presence information for the particular wireless device comprises information related to a state of the particular wireless device or information related to a status of the particular wireless device.

5. The server of claim 1, wherein the location information for the particular wireless device comprises global positioning information related to the particular wireless device.

6. The server of claim 1, wherein the core network node comprises a mobile switch center (MSC), a packet date node, or a home location register (HLR).

7. The server of claim 1, wherein the presence information for the particular wireless device is derived from the location information.

8. The message server of claim 1, wherein the location information for the particular wireless device and the presence information for the particular wireless device are aggregated into the message.

9. The message server of claim 1, wherein the location request comprises a request for information related to an attach, a detach, or location area update of the particular wireless device.

10. A method comprising:
transmitting, by a server comprising one or more processors, a location request to a core network node, the location request including a request for a current location of a particular wireless device;
receiving, by the server, a message from the core network node comprising location information for the particular wireless device and presence information for the particular wireless device in response to the location request;
transmitting, by the server, the location information for the particular wireless device to a given application operating on a given network node; and
transmitting, by the server, the presence information for the particular wireless device to another application operating on another network node.

11. The method of claim 10, wherein the other application subscribes to the presence information for the particular wireless device.

12. The method of claim 10, wherein the given application triggers the location requested and the other application receives the presence information for the particular wireless device without requesting the presence information for the particular wireless device.

13. The method of claim 10, wherein the presence information for the particular wireless device comprises information related to a state of the particular wireless device or information related to a status of the particular wireless device.

14. The method of claim 10, wherein the location information for the particular wireless device comprises global positioning information related to the particular wireless device.

15. The method of claim 10, wherein the presence information for the particular wireless device is derived from the location information for the particular wireless device.

16. The method of claim 10, wherein the location information for the particular wireless device and the presence information for the particular wireless device are aggregated into the message.

17. The system of claim 10, wherein the location request comprises a request for information related to an attach, a detach, or a location area update for the particular wireless device.

18. A non-transitory computer readable medium comprising computer executable instructions that when executed by a processor facilitate the performance of operations, the operations comprising:
transmitting, from a server, a location request to a core network node, the location request including a request for a current location of a particular wireless device;
receiving, by the server, a message from the core network node comprising location information for the particular wireless device and presence information for the particular wireless device in response to the location request;
transmitting, from the server, the location information for the particular wireless device to a given application operating on a given network node; and
transmitting, from the server, the presence information for the particular wireless device to another application operating on another network node.

19. The non-transitory computer readable medium of claim 18, wherein the new presence information for the particular wireless device is related to an availability of the particular wireless device to receive a text message or an incoming call.

20. The non-transitory computer readable medium of claim 19, wherein the presence information for the particular wireless device comprises information related to a state of the particular wireless device or information related to a status of the particular wireless device.

* * * * *